(12) United States Patent
Benz-Breitweg et al.

(10) Patent No.: US 12,731,975 B2
(45) Date of Patent: Sep. 8, 2026

(54) SEALING DEVICE FOR SEALING A CURRENT-CARRYING ELEMENT, METHOD FOR MOUNTING A SEALING DEVICE, AND USE OF A SEALING DEVICE

(71) Applicant: ZF FRIEDRICHSHAFEN AG, Friedrichshafen (DE)

(72) Inventors: Stefan Benz-Breitweg, Wolfegg (DE); Linus Eschenbeck, Wangen (DE); Michael Mueller, Ravensburg (DE); Florian Pöhnlein, Stefansfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 126 days.

(21) Appl. No.: 17/849,084

(22) Filed: Jun. 24, 2022

(65) Prior Publication Data

US 2023/0009848 A1 Jan. 12, 2023

(30) Foreign Application Priority Data

Jul. 8, 2021 (DE) .................... 10 2021 207 191.0

(51) Int. Cl.
*H02G 15/013* (2006.01)
*B60R 16/02* (2006.01)
*H02G 3/22* (2006.01)

(52) U.S. Cl.
CPC ....... *H02G 15/013* (2013.01); *B60R 16/0222* (2013.01); *H02G 3/22* (2013.01)

(58) Field of Classification Search
CPC ........ H02G 3/22; H02G 15/013; H01B 17/30; B60R 16/0222
See application file for complete search history.

(56) References Cited

U.S. PATENT DOCUMENTS 10,697,350 B2 * 6/2020 Looser ............... G05D 23/1852
2007/0207652 A1 * 9/2007 Tsuruta .................... H01R 4/30 439/166
2016/0090897 A1 * 3/2016 Looser .................. G05D 23/30 236/34.5
2017/0162299 A1 * 6/2017 Komori .................. H01R 13/52
2018/0317334 A1 * 11/2018 Grotz ................... H05K 5/0247
2023/0238158 A1 * 7/2023 Komori .................. H01B 17/58 174/656

FOREIGN PATENT DOCUMENTS

DE 10103008 7/2002
DE 102007008098 12/2015
WO WO 2017072073 5/2017

OTHER PUBLICATIONS

Office Action corresponding German Patent Application No. 10 2021 207 191.0.

* cited by examiner

*Primary Examiner* — Timothy J Thompson
*Assistant Examiner* — Rhadames Alonzo Miller
(74) *Attorney, Agent, or Firm* — COZEN O'CONNOR

(57) ABSTRACT

A sealing device for sealing a current-carrying element on an electrical drive system. The sealing device includes an elastic form sealing unit for insulating the current-carrying element against at least a part region of the electrical drive. The sealing device also includes a non-elastic guide sealing unit for guiding the current-carrying element, wherein the form sealing unit and the guide sealing unit are formed to engage in one another at least partially by form fit in operational state.

15 Claims, 10 Drawing Sheets

SEALING DEVICE FOR SEALING A CURRENT-CARRYING ELEMENT, METHOD FOR MOUNTING A SEALING DEVICE, AND USE OF A SEALING DEVICE

BACKGROUND OF INVENTION

1. Field of the Invention

The present disclosure relates a sealing device for sealing a current-carrying element, a method for mounting a sealing device, and a use of a sealing device.

2. Description of Related Art

In order to attach current-carrying parts to an electrical drive, they must be shielded and protected by corresponding insulators since adjacent components (which may also serve as fixings for the guide) are often made of metal and may therefore be conductive. In the insulation, also certain spacings such as air gaps and creep distances must be observed. For insulating such current-carrying components, plastics, ceramics or similarly well-insulating materials may be used.

SUMMARY OF THE INVENTION

In this context, one aspect of the invention proposes an improved sealing device for sealing a current-carrying element, an improved method for mounting a sealing device, and an improved use of a sealing device.

The sealing device presented here may advantageously seal a current-carrying element against different media, wherein production costs may be minimised.

A sealing device is proposed for sealing a current-carrying element on an electrical drive system, wherein the sealing device has an elastic form sealing unit for insulating the current-carrying element against at least a part region of the electrical drive. The sealing device also comprises a non-elastic guide sealing unit for guiding the current-carrying element, wherein the form sealing unit and the guide sealing unit are formed to engage in one another at least partially by form fit in operational state, in particular wherein the guide sealing unit is configured to engage in the form sealing unit. The current-carrying element may for example be a stud terminal for conducting current to an electrical drive.

The electrical drive system may accordingly be a system which can guide current lines from an internal electrical machine outward through a housing, for example to the power electronics of an electrified transmission. The current may be conducted for example via current-carrying lines and corresponding insulators or air gaps. For example, it may comprise either a cable passage or also a two-sided screw mounting on an insulated stud terminal.

A power electronics fitted directly to a transmission may for example supply three high-voltage phases from a power electronics space, through the transmission housing via three housing bores, into an ATF fluid space, to busbars of an electrical machine. The sealing device proposed here, for example the seal, may fulfil two purposes. It may firstly fulfil the purpose of sealing against ATF transmission fluid, in order for example to prevent the ATF fluid from entering the space of the power electronics. Secondly, the sealing device may fulfil the purpose of insulating and shielding the current-carrying component against the transmission housing. Here, by the elastic form sealing unit, advantageously the stud terminal may be insulated over a large area in the region of the ATF fluid space in order to minimise leakage currents.

The form sealing unit may for example be made of elastomer and may also accordingly be described as an elastomer seal or rubber seal. Since the material of the form sealing unit may be very costly, the sealing device is designed such that, advantageously, as little material as possible as required. The seal is therefore constructed in two parts. By the non-elastic guide sealing unit, which for example may be configured as a solid plastic component, the sealing device may be positioned for mounting of the stud terminal and also held stable against vibrations during operation. This hard part of the seal may have the function of centring or guidance during mounting and stabilisation under vibrational load. Also, with the solid part of the seal, a defined contact pressure can be created on the elastic form sealing unit towards the transmission housing bore. For example, by pressing the plastic part and rubber seal into the housing, a very stable connection can be created. This may be suitable for holding further components on the inside on the electrical machine or on the outside on the power electronics. The components may advantageously be fixed and protected from impacts and oscillations or vibrations. Also, by this fixing of the inner parts, for example at an inner screw point, for example tolerances can be compensated with a sliding nut. Thus this arrangement may perform the task of tolerance compensation in the axial and radial direction. The two-piece seal may reduce costs, since for example cost-intensive rubber mixtures may be necessary for high-voltage applications.

According to one aspect, the form sealing unit and the guide sealing unit are configured as separate and/or separable units. For example, the form sealing unit and the guide sealing unit may be able to be produced independently of one another, wherein for example the form sealing unit may be made from an elastic elastomer and the guide sealing unit for example from a non-elastic plastic. The form sealing unit and the guide sealing unit may for example only be assembled into the complete sealing device during mounting in or on an electrical drive system. This has the advantage that the sealing device can be produced particularly economically.

According to a further aspect, the sealing device may be designed to be at least partially hollow-cylindrical. For example, the form sealing unit and additionally or alternatively the guide sealing unit may be designed to surround the current-carrying element, for example a stud terminal, as a ring. This has the advantage that a seal of the current-carrying element against the drive system may be implemented optimally.

According to a further aspect, the guide sealing unit may have at least one positioning portion for positioning the sealing device in an opening of a housing of the electrical drive, wherein the positioning portion may have a radially extending flange. The guide sealing unit may here have at least one inner portion opposite the positioning portion, wherein the flange may have a greater outer diameter than the inner portion. For example, the guide sealing unit may be formed in steps, wherein in operational state of the sealing device, the positioning portion may form an outer step which for example may be designed to achieve a minimum necessary creep distance of for example 5.6 mm in the dry space. The radially extending flange may have a greater outer diameter than the inner portion, in order advantageously to prevent inserting the sealing device too far into the opening. Advantageously, a current-carrying element may be optimally positioned or centred by such a design.

According to a further aspect, the form sealing unit may have a sealing lip for sealing the current-carrying element against fluids, and a receiving portion for receiving at least part of the guide sealing unit, wherein a diameter of the receiving portion may be greater than a diameter of the sealing lip. For example, the sealing lip may be designed and configured to be conical or hollow-cylindrical, so as to shield a maximal surface of the current-carrying element for example against an ATF fluid space, wherein for example a necessary creep distance of 8 mm in the wet space may be observed. The receiving portion may be arranged on a side of the form sealing unit opposite the sealing lip, wherein because of the larger diameter than that of the sealing lip, the receiving portion may form a step for receiving the guide sealing unit. Advantageously, thereby an optimal seal may be achieved, wherein the form sealing unit and the guide sealing unit may at the same time engage in one another optimally by form fit.

According to a further aspect, a diameter of the inner portion of the guide sealing unit, within a tolerance range of for example 10%, may correspond to a diameter of the sealing lip of the form sealing unit, and additionally or alternatively a diameter of the positioning portion of the guide sealing unit may be at least 20% larger than a diameter of the receiving portion of the form sealing unit. For example, the inner portion and the sealing lip may be designed with the same diameter, so that the receiving of the guide sealing unit in the form sealing unit creates a stop point which may prevent an undesirable penetration of the guide sealing unit into the inner portion of the form sealing unit. Advantageously, the form sealing unit and the guide sealing unit may thus engage in one another with precise fit in the mounted state. At the same time, the diameter of the positioning portion of the guide sealing unit may for example be designed 30% larger than the diameter of the receiving portion of the form sealing unit. This may have the advantage of facilitating the positioning of the sealing device and for example the subsequent fixing of the sealing device.

According to a further aspect, a diameter of the inner portion of the guide sealing unit may be greater than a diameter of the sealing lip of the form sealing unit, and additionally or alternatively, a diameter of the positioning portion of the guide sealing unit may be at most 10% larger than a diameter of the receiving portion of the form sealing unit. Thus the sealing device may have two different diameters at the guide sealing unit, for example at the plastic body. The inner diameter may be larger than the diameter of the sealing lip, and the outer diameter may be smaller at the positioning portion. Advantageously, the individual parts of the sealing device, i.e. the guide sealing unit and the form sealing unit, may be mechanically coded, preventing an incorrect cross-mounting during assembly of the sealing device. The mechanical differentiation of the plastic part may for example also be implemented on the housing of the transmission. The diameter of the positioning portion may however, for example, only be partially present on the housing. This may advantageously improve visual fault recognition.

According to a further aspect, the form sealing unit may have a thickening region for sealing the guide sealing unit against the housing. For example, the thickening region may be arranged on the receiving portion. Advantageously, this may optimise a defined pressing of the soft seal between the hard plastic component and a housing bore of the electrical drive system.

According to a further aspect, the guide sealing unit may have a cut-out for holding the form sealing unit in or on the guide sealing unit by form fit. The cut-out may for example be arranged on the inner portion of the guide sealing unit and for example be formed as a groove, and additionally or alternatively as an undercut. This has the advantage that the elastic form sealing unit can be optimally held, in particular during delivery and installation of the sealing device.

According to a further aspect, the guide sealing unit may be designed with a rib structure. For example, a plurality of ribs may be arranged radially along an inside of the positioning portion of the guide sealing unit. Advantageously, such a rib structure may save material in production of the guide sealing unit.

According to a further aspect, the form sealing unit may be made from a fluororubber-containing material, and additionally or alternatively, the guide unit may be made from a material which differs from the material of the form sealing unit. For example, the seal against ATF fluid may be achieved by form seal made of a high-temperature-resistant FRM material. The material has the advantage over other standard elastomers that it still has good insulation values even at high temperatures of up to 160° C. The second part of the sealing device, i.e. the guide sealing unit, may however for example consist of a PPS GF60. The material for the hard sealing part may also meet requirements of insulation. These may however be slightly lower since this part is situated in the dry space of the power electronics and cannot come into contact with fluid. Advantageously, such a combination can also save cost-intensive elastomer material, wherein the sealing device may simultaneously seal against different media, such as for example oil, air, water etc. Additionally or alternatively, it may also seal against noise and electromagnetic waves. The protection against electromagnetic waves may be achieved for example by metal powder in the guide sealing unit.

Also, a method is proposed for mounting a variant of the above-described sealing device. The method comprises a step of providing a form sealing unit and a guide sealing unit, and a step of mounting the form sealing unit with the guide sealing unit in order to produce the sealing device.

Also, a use is proposed of a variant of the above-described sealing device for sealing a current-carrying element on an electrical drive system.

The method may for example be implemented in software or hardware, or in a mixed form of software and hardware, for example in a control unit.

A control unit may be an electrical device that processes electrical signals, for example sensor signals, and emits control signals depending thereon. The control unit may have one or more suitable interfaces which may be formed with hardware and/or software. When formed with hardware, the interfaces may for example be part of an integrated circuit in which functions of the device are implemented. The interfaces may also be separate integrated circuits, or consist at least partially of discrete components. When formed with software, the interfaces may be software modules which for example are present on a microcontroller together with other software modules.

Also advantageous is a computer program product with program code which can be stored on a machine-legible support such as a semiconductor memory, a hard disk memory or an optical memory, and be used for performing the method according to one of the above-described embodiments when the program is executed on a computer or a device.

BRIEF DESCRIPTION OF THE DRAWINGS

The invention is described in more detail as an example with reference to the appended drawings. The drawings show.

DETAILED DESCRIPTION OF THE PRESENTLY PREFERRED EMBODIMENTS

Figure 1:
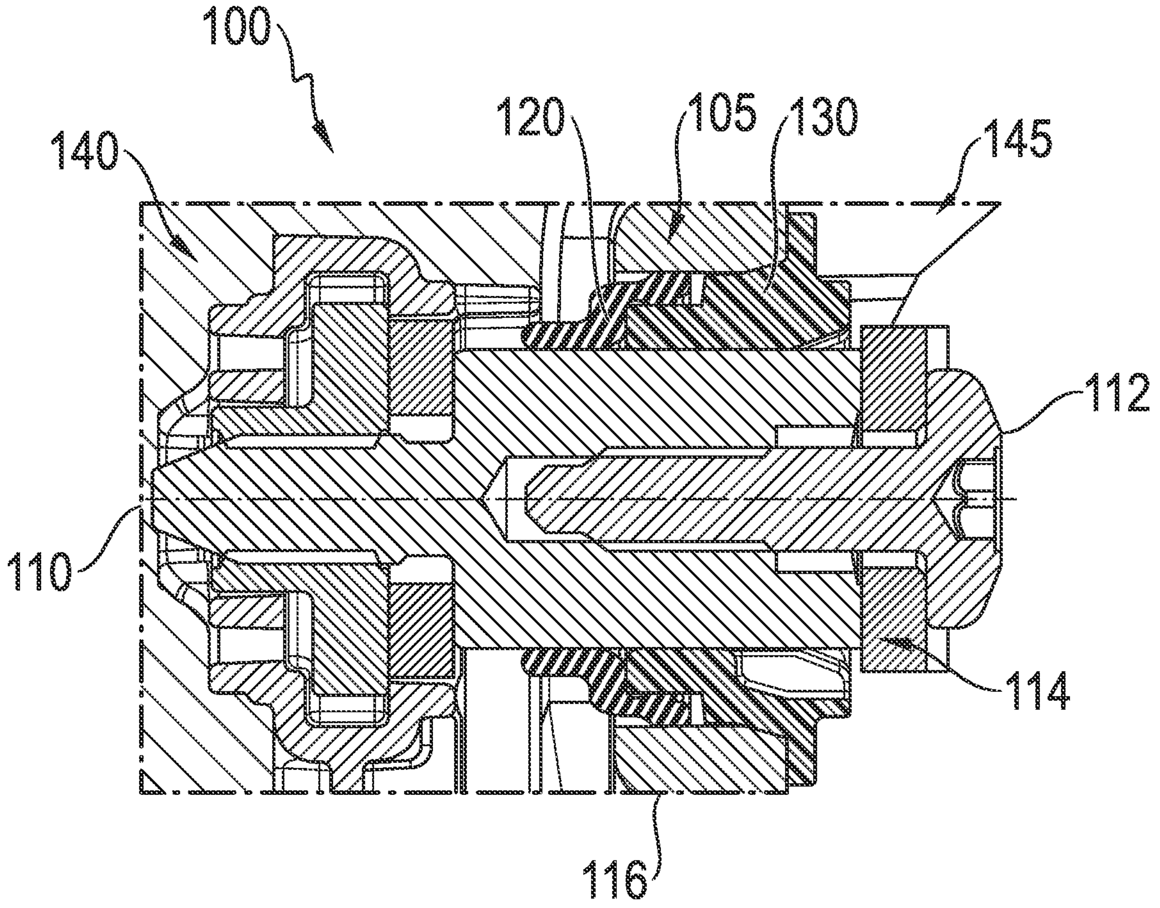
FIG. 1 is a schematic, cross-sectional illustration of an electrical drive system with a sealing device.

In the following description of preferred exemplary embodiments of the present invention, the same or similar reference signs are used for elements of similar function which are illustrated in the various figures, wherein a repeated description of these elements is omitted. FIG. 1 shows a schematic, cross-sectional illustration of an exemplary embodiment of an electrical drive system 100 with a sealing device 105 for sealing a current-carrying element 110. In this exemplary embodiment, the current-carrying element 110 is configured purely as an example as a stud terminal and can be fixed with a screw 112 in an opening 114 of a housing 116 of the drive system 100. The sealing device 105 comprises an elastic form sealing unit 120 for insulating the current-carrying element 110 against a part region of the electrical drive, and a non-elastic guide sealing unit 130 for guiding the current-carrying element 110. Purely as an example, the form sealing unit 120 and the guide sealing unit 130 are formed as separate units which can be pressed together during assembly. For this, the form sealing unit 120 and the guide sealing unit 130 are designed to engage in one another partially by form fit in operational state. In this exemplary embodiment, the guide sealing unit 130 is configured to engage in the form sealing unit.

In this exemplary embodiment, the form sealing unit 120 is configured to seal the current-carrying element 110 against transmission fluid, for example ATF fluid, from an ATF space 140 of the housing 116, which could also be described as the transmission housing. For this, the form sealing unit 120, purely as an example, is made of a high-temperature-resistant fluororubber material (FRM), so it could also be described as an elastomer seal. The material has the advantage over other standard elastomers that it has good insulation values even at high temperatures of up to 160° C. Since the material is very costly, the seal has been designed such that as little material as possible is required. The sealing device 105 is therefore constructed in two pieces. The second part, i.e. the guide sealing unit 130, in this exemplary embodiment consists of polyphenyl sulphide PPS GF60. This hard part of the sealing device 105 performs the function of centring or guidance during mounting, and stabilisation under vibration load. Also, with the guide sealing unit 130, a defined contact pressure can be produced on the form sealing unit 120 towards the opening 114, which can also be described as a transmission housing bore. The material for the guide sealing unit 130 also fulfils requirements of insulation. These are however slightly lower since this part is situated in the dry space 145 of the power electronics and does not come into contact with fluid.

Figure 2:
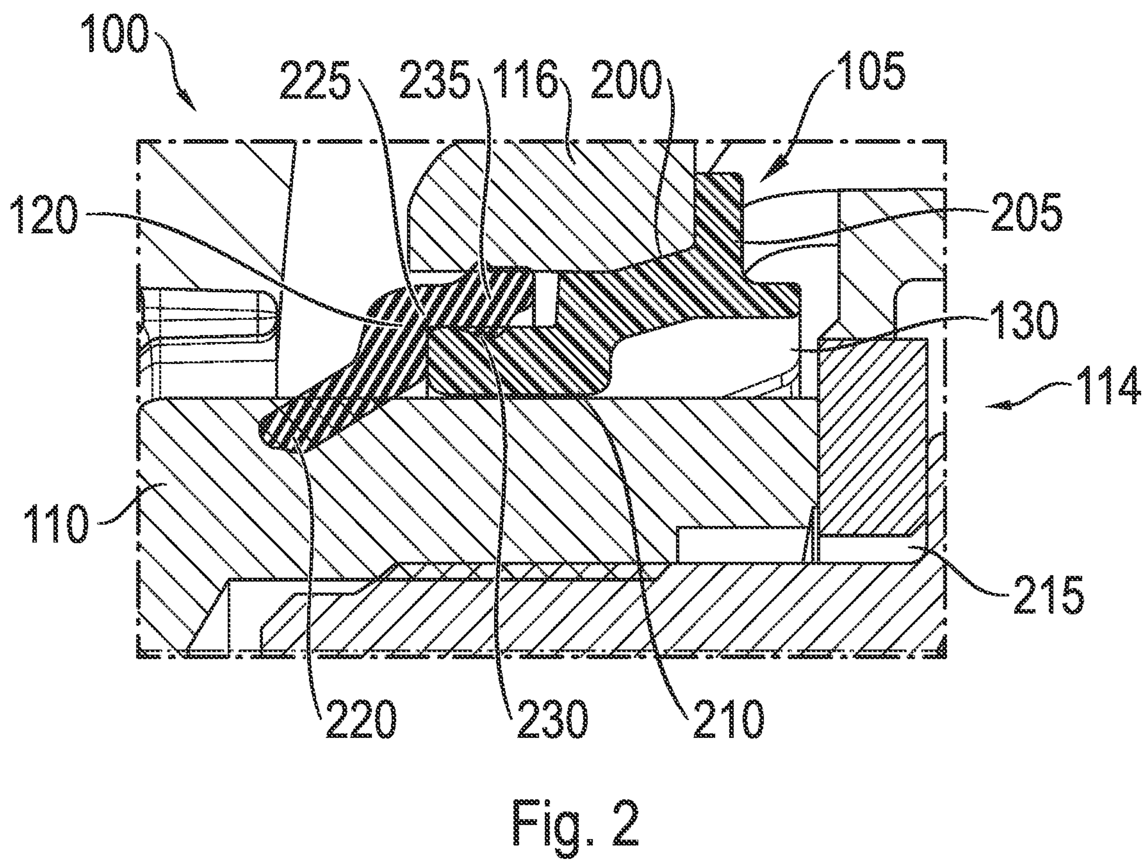
FIG. 2 is a schematic, cross-sectional illustration of an extract of a sealing device.

FIG. 2 shows a schematic, cross-sectional illustration of an exemplary embodiment of an extract of a sealing device 105. The sealing device 105 illustrated here corresponds to or resembles the sealing device described in the preceding figure, and is arranged in an opening 114 of a housing 116 of an electrical drive system 100 in order to seal a current-carrying element 110 against the drive system 100. In this exemplary embodiment, the guide sealing unit 130 has a positioning portion 200 for positioning the sealing device 105 in the opening 114. The positioning portion 200 is designed, purely as an example, with a radially extending flange 205. Furthermore, the guide sealing unit 130 in this exemplary embodiment has an inner portion 210 opposite the positioning portion 200, wherein the flange 205 has a greater outer diameter than the inner portion 210, as shown in the following FIG. 3. The outer diameter of the positioning portion 210 could also be described as an outer collar diameter. In other words, the hard sealing part is designed with a step on an end face towards the power electronics busbar 215 of the drive system 100. The step secures the sealing device 105 against axial movement and, purely as an example, is geometrically configured so as to achieve the air gap of 3 mm and creep distance of 5.6 mm necessary in the drive system 100 shown here.

In this exemplary embodiment, the form sealing unit 120 is also formed as a step and has a sealing lip 220 for sealing the current-carrying element 110 against liquids. Purely as an example, in this exemplary embodiment, the sealing lip 220 is designed to be conical and is configured so as to maintain a creep distance of 8 mm in the wet space. On a side of the form sealing unit 120 opposite the sealing lip 220, purely as an example, a receiving portion 225 is arranged for receiving a part of the guide sealing unit 130, wherein an inner diameter of the receiving portion 225 is greater than an inner diameter of the sealing lip 220. Because of the respective stepped forms of the form sealing unit 120 and guide sealing unit 130, the inner portion 210 of the guide sealing unit 130 engages by form fit in the receiving portion 225 of the form sealing unit 120. In order to optimise the retention of the guide sealing unit 130 in the receiving portion 225, in this exemplary embodiment, the guide sealing unit 130 is designed with a cut-out 230. The cut-out 230 is designed, purely as an example, to receive by form fit a thickening region 235 of the form sealing unit 120. In this exemplary embodiment, the thickening region 235 is configured to seal the guide sealing unit 130 against the housing 116. A very stable connection can be produced by pressing the plastic part and rubber seal into the housing 116. This is suitable for fixedly holding further components on the inside on the electrical machine or on the outside on the power electronics. The components are fixable and protected against impacts and oscillations or vibrations. Via this fixing of the inner parts at the inner screw point, tolerance compensation is possible by a sliding nut. Thus this arrangement fulfils the requirements of tolerance compensation in the axial and radial direction. The two-piece seal lowers costs, since costly rubber mixtures are required for high-voltage applications.

Figure 3:
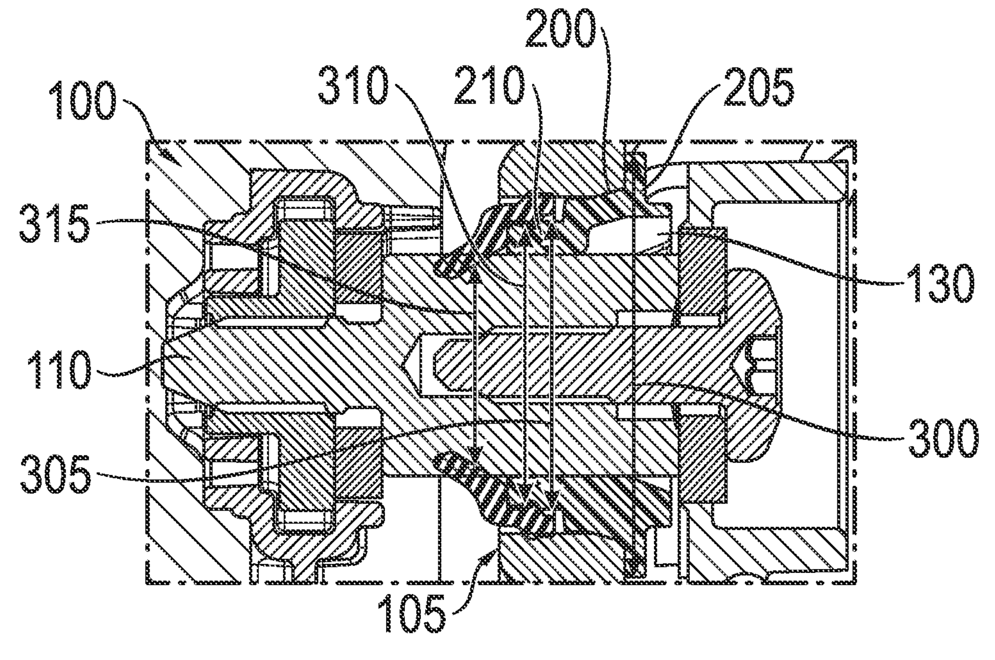
FIG. 3 is a schematic, cross-sectional illustration of an electrical drive system with a sealing device.

FIG. 3 shows a schematic cross-sectional illustration of an exemplary embodiment of an electrical drive system 100 with a sealing device 105 for sealing a current-carrying element 110. The sealing device 105 illustrated here corresponds to or resembles the sealing device described in the preceding figures. In this exemplary embodiment, the guide sealing unit 130 comprises a positioning portion 200 with a radially extending flange 205, and an inner portion 210 opposite the positioning portion 200. An outer diameter 300 of the flange 205 of the positioning portion 200 is greater than an outer diameter 305 of the inner portion 210. In this exemplary embodiment, the guide sealing unit 130 engages in the form sealing unit 120. The form sealing unit 120 has for this a receiving portion 225, wherein an inner diameter 310 of the receiving portion 225 is greater than an inner diameter 315 of the sealing lip 220.

Figure 4:
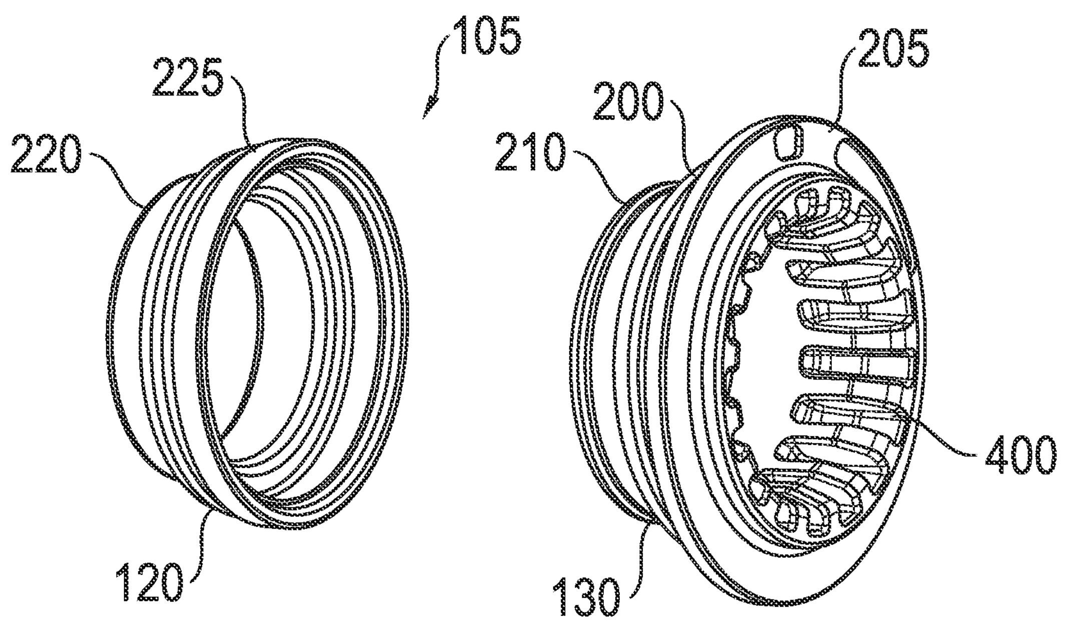
FIG. 4 is a perspective, side view of a sealing device.

FIG. 4 shows a perspective, side view of an exemplary embodiment of a sealing device 105. The sealing device 105 illustrated here corresponds to or resembles the sealing device described in the preceding figures. In this exemplary embodiment, the form sealing unit 120 and the guide sealing unit 130 of the sealing device 105 are hollow-cylindrical and configured as separate units. Purely as an example, the guide sealing unit 130 is designed with a rib structure 400 which, in this exemplary embodiment, extends radially on an inside of the hollow-cylindrical positioning portion 200. Also, purely as an example, the guide sealing unit 130 has a flange 205 extending radially around the positioning portion 200, and an inner portion 210 opposite the positioning portion 200. In this exemplary embodiment, the positioning portion 200 is designed with a rib structure 400. Purely as an example, the form sealing unit 120 comprises a sealing lip 220 and a receiving portion 225 for receiving the guide sealing unit 130. In this exemplary embodiment, an inner diameter of the inner portion 210 of the guide sealing unit 130 corresponds to an inner diameter of the sealing lip 220 of the form sealing unit 120. Also, a diameter of the positioning portion 200 is 20% larger than a diameter of the receiving portion 225 of the form sealing unit 120.

Figure 5:
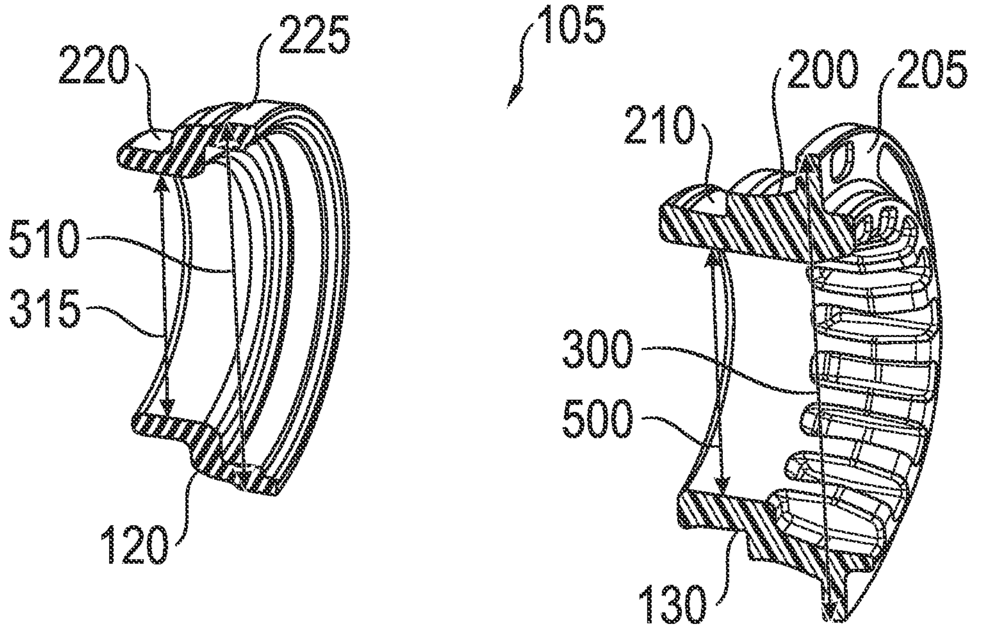
FIG. 5 is a perspective, cross-sectional illustration of a sealing device.

FIG. 5 shows a perspective, cross-sectional illustration of an exemplary embodiment of the sealing device 105. The sealing device 105 illustrated here corresponds to or resembles the sealing device described in the preceding figures, wherein the form sealing unit 120 and the guide sealing unit 130 are configured as separate units. In this exemplary embodiment, an inner diameter 500 of the inner portion 210 of the guide sealing unit 130 corresponds to an inner diameter 315 of the sealing lip 220 of the form sealing unit 120. Also, purely as an example, the outer diameter 300 of the flange 205 of the positioning portion 200 is 20% larger than an outer diameter 510 of the receiving portion 225 of the form sealing unit 120. The outer diameter 300 of the flange 205 of the positioning portion 200 may also, for simplicity, be described as the outer diameter of the positioning portion.

Figure 6:
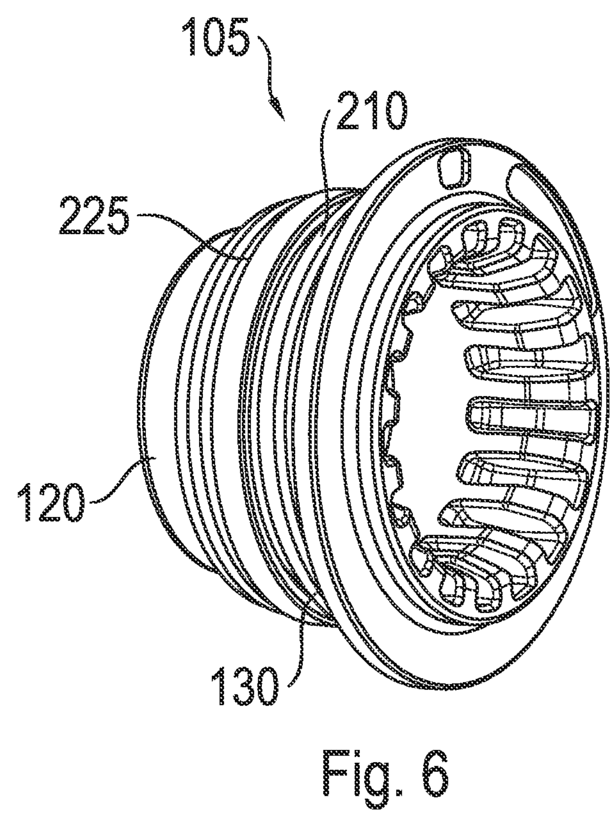
FIG. 6 is a perspective, side view of a sealing device.

FIG. 6 shows a perspective, side view of an exemplary embodiment of a sealing device 105. The sealing device 105 illustrated here corresponds to or resembles the sealing device described in the preceding figures. In the illustration shown here, the sealing device is shown in mounted state, wherein the inner portion 210 of the guide sealing device 130 is arranged in the receiving portion 225 of the form sealing unit 120.

Figure 7:
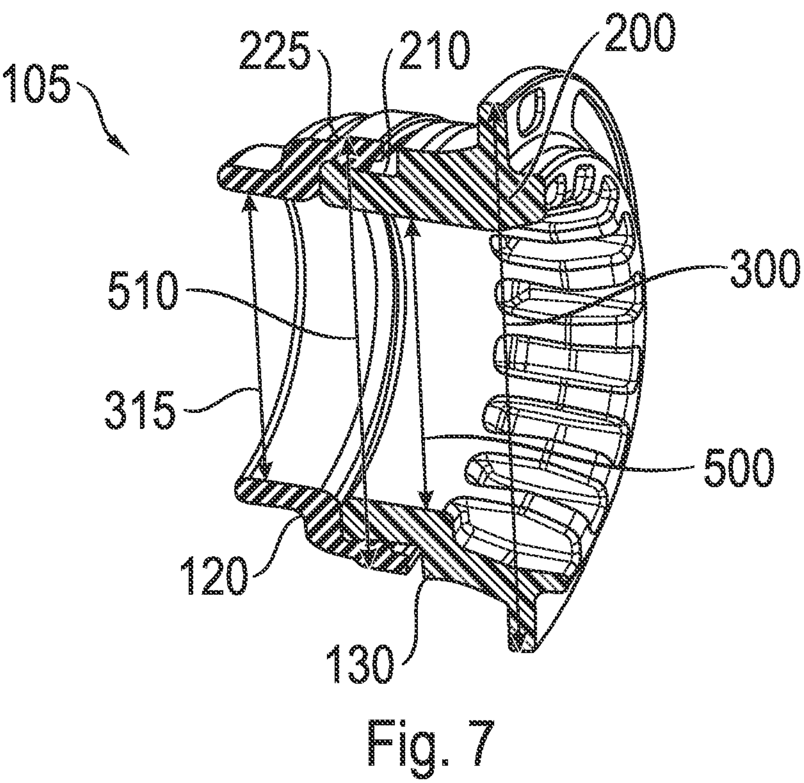
FIG. 7 is a perspective, cross-sectional illustration of a sealing device.

FIG. 7 shows a perspective, cross-sectional illustration of an exemplary embodiment of a sealing device 105. The sealing device 105 illustrated here corresponds to or resembles the sealing device described in the preceding figures. In the illustration shown here, the sealing device is shown in pressed state, wherein the inner portion 210 of the guide sealing device 130 is arranged in the receiving portion 225 of the form sealing unit 120. An inner diameter 500 of the inner portion 210 of the guide sealing unit 130, purely as an example, corresponds to an inner diameter 315 of the sealing lip 220 of the form sealing unit 120, and in this exemplary embodiment an outer diameter 300 of the positioning portion 200 is 20% larger than an outer diameter 510 of the receiving portion 225 of the form sealing unit 120.

Figure 8:
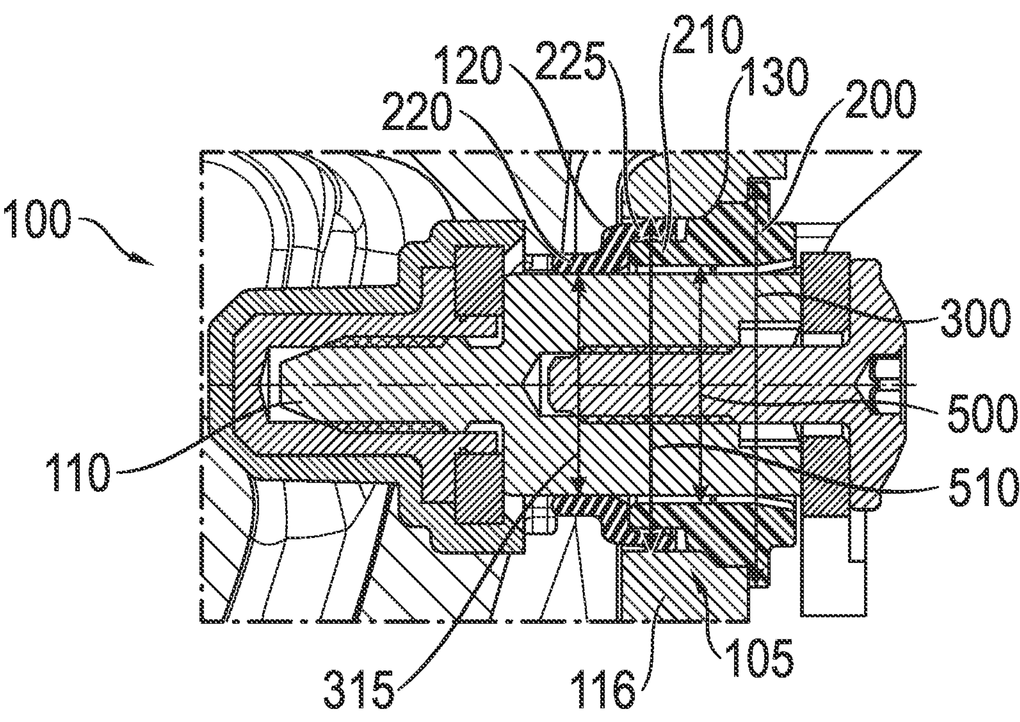
FIG. 8 is a schematic, cross-sectional illustration of an electrical drive system with a sealing device.

FIG. 8 shows a schematic, cross-sectional illustration of an exemplary embodiment of an electrical drive system 100 with a sealing device 105 for sealing a current-carrying element 110. The sealing device 105 illustrated here corresponds to or resembles the sealing device described in the preceding figures, with the difference that the inner diameter 500 of the inner portion 210 of the guide sealing unit 130, purely as an example, is greater than the inner diameter 315 of the sealing lip 220 of the form sealing unit 120. Also, in this exemplary embodiment, the outer diameter 300 of the positioning portion 200 of the guide sealing unit 130, purely as an example, is 10% larger than an outer diameter 510 of the receiving portion 225 of the form sealing unit 120. With the design of the electrical machine shown here, no tolerance compensation is possible in the interior. The two-piece seal with enlarged inner bore now provides the radial tolerance compensation. The radial fixing can he be omitted here since the screw point of the electrical machine in the housing 116 is fixed. In order to prevent incorrect cross-mounting of the form sealing unit 120 and the guide sealing unit 130 during assembly or repair, and resulting damage to the transmission, the sealing device 105 in this exemplary embodiment is formed on the plastic body with two different diameters. The inner diameter is larger than that of the exemplary embodiments shown in the preceding FIGS. 1 to 7, and the outer diameter (collar) is reduced. Thus the parts are mechanically coded and cannot be incorrectly cross-mounted.

Figure 9:
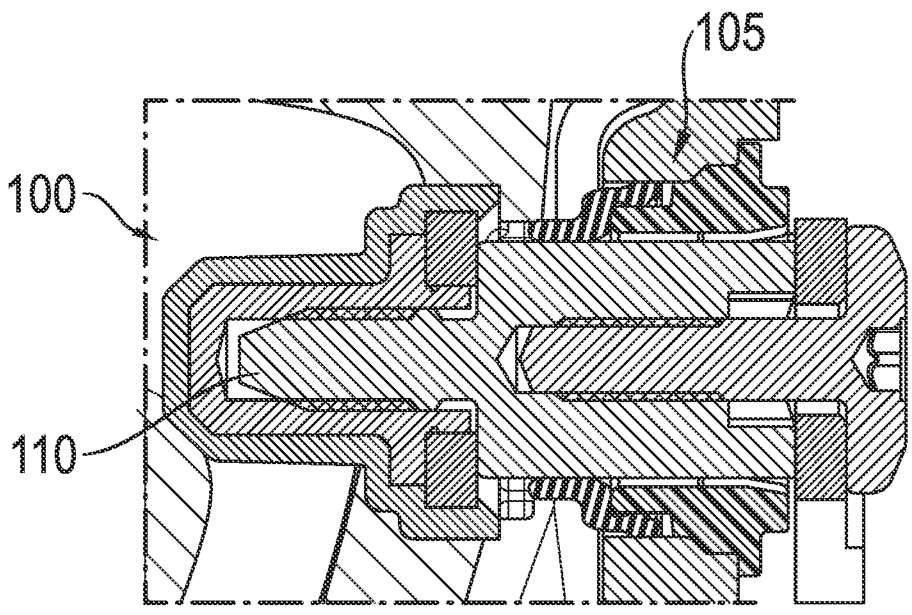
FIG. 9 is a schematic, cross-sectional illustration of an electrical drive system with a sealing device.

FIG. 9 shows a schematic, cross-sectional illustration of an exemplary embodiment of an electrical drive system 100 with a sealing device 105 for sealing a current-carrying element 110. The sealing device 105 illustrated here corresponds to or resembles the sealing device described in the preceding figures.

Figure 10:
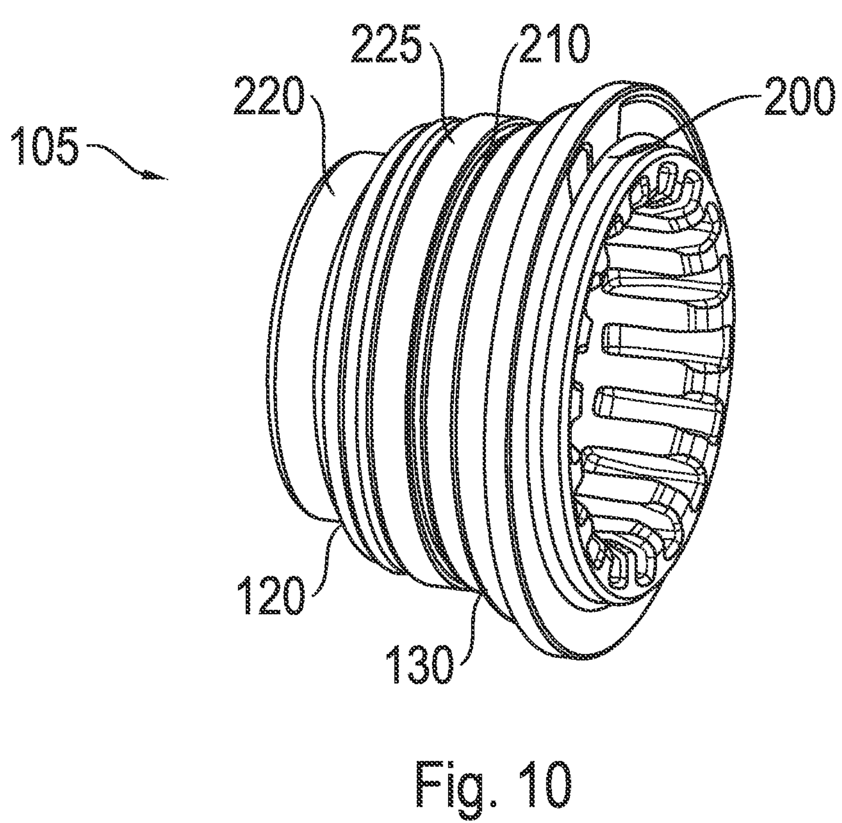
FIG. 10 is a perspective, side view of a sealing device.

FIG. 10 shows a perspective, side view of an exemplary embodiment of a sealing device 105. The sealing device 105 illustrated here corresponds to or resembles the sealing device described in the preceding figures. In the illustration shown here, the sealing device is shown in mounted state, wherein the inner portion 210 of the guide sealing device 130 is arranged in the receiving portion 225 of the form sealing unit 120. An inner diameter of the inner portion 210 of the guide sealing unit 130, purely as an example, is greater than an inner diameter of the sealing lip 220 of the form sealing unit 120. Also, in this exemplary embodiment, an outer diameter of the positioning portion 200 of the guide sealing unit 130, purely as an example, is 10% larger than an outer diameter of the receiving portion 225 of the form sealing unit 120.

Figure 11:
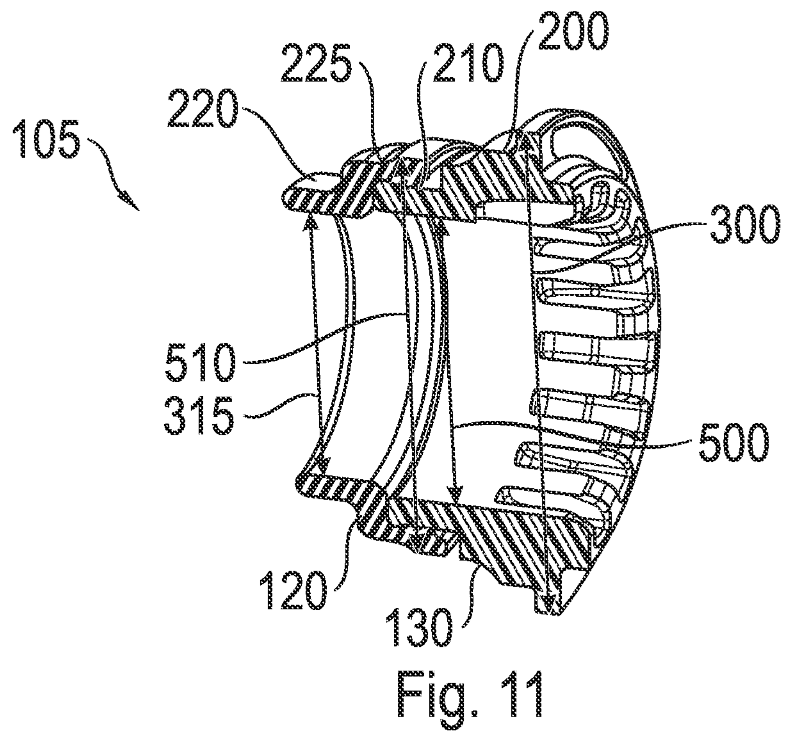
FIG. 11 is a perspective, cross-sectional illustration of a sealing device.

FIG. 11 shows a perspective, cross-sectional illustration of an exemplary embodiment of a sealing device 105. The sealing device 105 illustrated here corresponds to or resembles the sealing device described in the preceding figures. In the illustration shown here, the sealing device is shown in mounted state, wherein the inner portion 210 of the guide sealing device 130 is arranged in the receiving portion 225 of the form sealing unit 120. Purely as an example, an inner diameter 500 of the inner portion 210 of the guide sealing unit 130 is greater than an inner diameter 315 of the sealing lip 220 of the form sealing unit 120. Also, in this exemplary embodiment, an outer diameter 300 of the positioning portion 200 of the guide sealing unit 130, purely as an example, is 10% larger than an outer diameter 510 of the receiving portion 225 of the form sealing unit 120.

Figure 12:
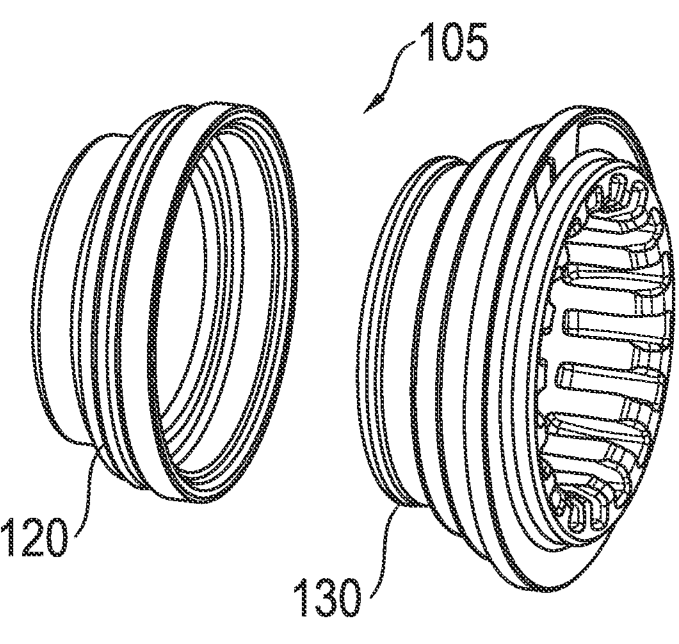
FIG. 12 is a perspective, side view of a sealing device.

FIG. 12 shows a perspective, side view of an exemplary embodiment of a sealing device 105. The sealing device 105 illustrated here corresponds to or resembles the sealing device described in the preceding figures, wherein the form sealing unit 120 and the guide sealing unit 130 are configured as separate units.

Figure 13:
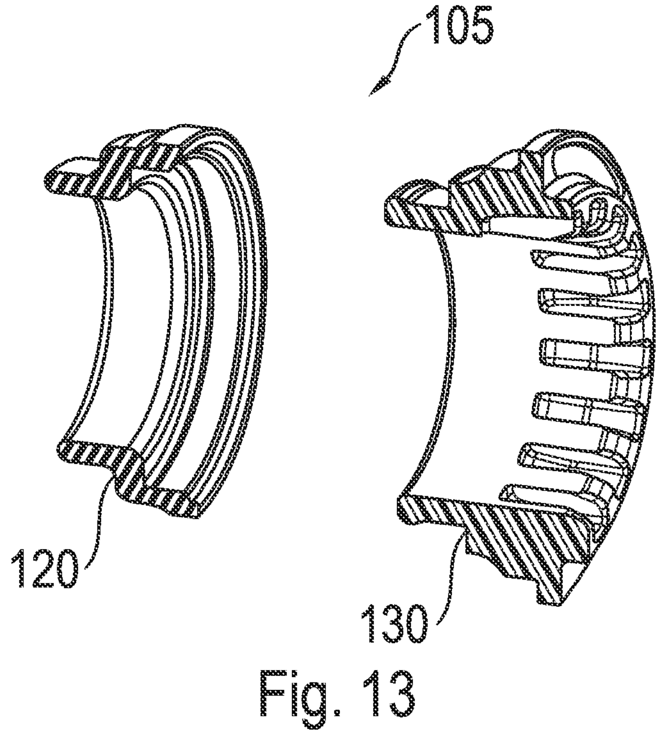
FIG. 13 is a perspective, cross-sectional illustration of a sealing device.

FIG. 13 shows a perspective, cross-sectional illustration of an exemplary embodiment of a sealing device 105. The sealing device 105 illustrated here corresponds to or resembles the sealing device described in the preceding figures, wherein the form sealing unit 120 and the guide sealing unit 130 are configured as separate units.

Figure 14:
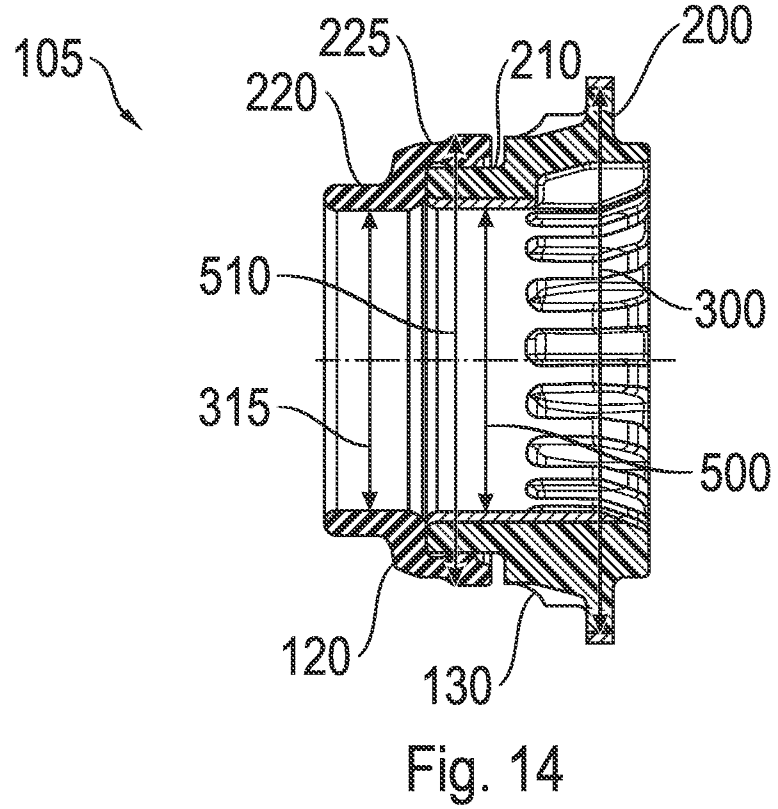
FIG. 14 is a cross-sectional illustration of a sealing device.

FIG. 14 shows a cross-sectional illustration of an exemplary embodiment of a sealing device 105. The sealing device 105 illustrated here corresponds to or resembles the sealing device described in the preceding figures. In the illustration shown here, the sealing device is shown in pressed state, wherein the inner portion 210 of the guide sealing device 130 is arranged in the receiving portion 225 of the form sealing unit 120. For reasons of illustration, the guide sealing unit 130 is shown with different diameters in this figure. Firstly, a variant is shown in which an inner diameter 500 of the inner portion 210 is greater than an inner diameter 315 of the sealing lip 220, and an outer diameter 300 of the positioning portion 200 is only 10% larger than an outer diameter 510 of the receiving portion 225 of the form sealing unit 120. Secondly, also a variant of the guide sealing unit 130 is shown, in which an inner diameter 500 of the inner portion 210 corresponds to an inner diameter 315 of the sealing lip 220, and an outer diameter 300 of the positioning portion 200 is 20% larger than an outer diameter 510 of the receiving portion 225. The two exemplary embodiments are illustrated visually superimposed on one another in the figure shown here.

Figure 15:
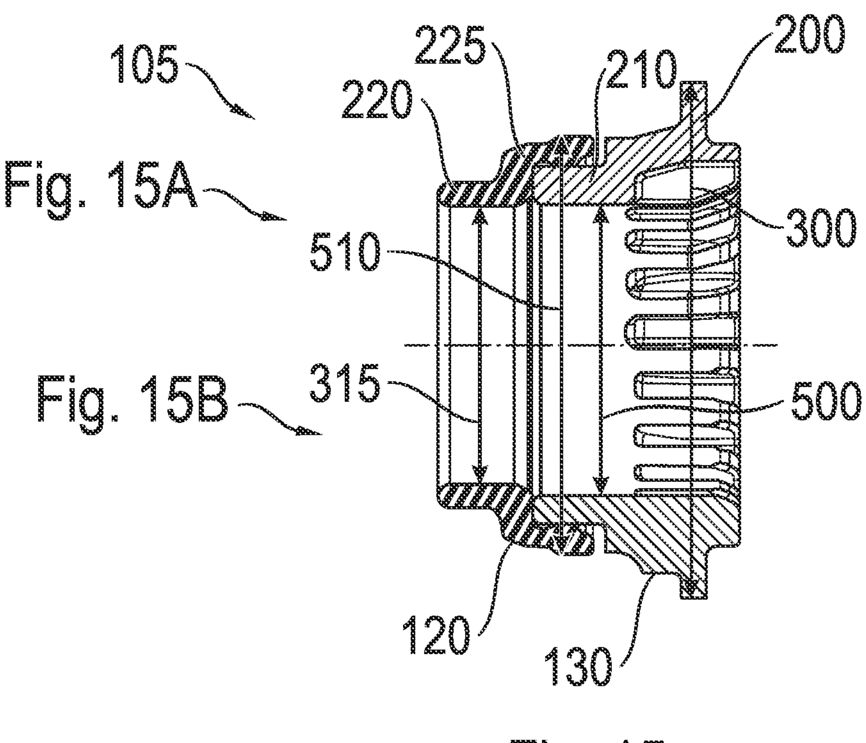
FIG. 15 is a cross-sectional illustration of a sealing device.

FIG. 15 shows a cross-sectional illustration of an exemplary embodiment of the sealing device 105. The sealing device 105 illustrated here corresponds to or resembles the sealing device described in the preceding figures. In the illustration shown here, the sealing device is shown in pressed state, wherein the inner portion 210 of the guide sealing device 130 is arranged in the receiving portion 225 of the form sealing unit 120. For reasons of illustration, the guide sealing unit 130 is shown with different diameters in this figure. In the upper part FIG. 15A, a variant is shown in which the inner diameter 500 of the inner portion 210 corresponds to the inner diameter 315 of the sealing lip 220, and the outer diameter 300 of the positioning portion 200 is 20% larger than the outer diameter 510 of the receiving portion 225. In the lower part FIG. 15B, a variant is shown in which the inner diameter 500 of the inner portion 210 is greater than the inner diameter 315 of the sealing lip 220, and the outer diameter 300 of the positioning portion 200 is only 10% larger than the outer diameter 510 of the receiving portion 225 of the form sealing unit 120.

Figure 16:
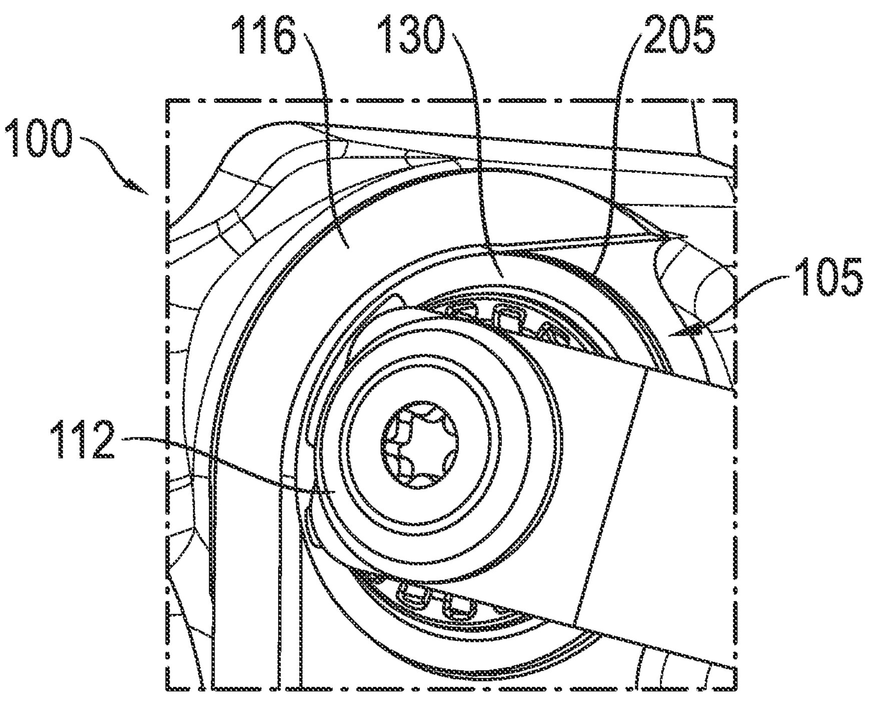
FIG. 16 is a schematic illustration of a screw-fitted sealing device.

FIG. 16 shows a schematic illustration of an exemplary embodiment of a screw-fitted sealing device 105. The sealing device 105 illustrated here corresponds to or resembles the sealing device described in the preceding figures and is screw-fitted by a screw 112 on the housing 116 of an electrical drive system 100. Thus the mechanical differentiation of the plastic parts is also implemented on the housing 116. The flange 205 of the guide sealing unit 130 is only partially present on the housing 116. This improves fault recognition during mounting.

Figure 17:
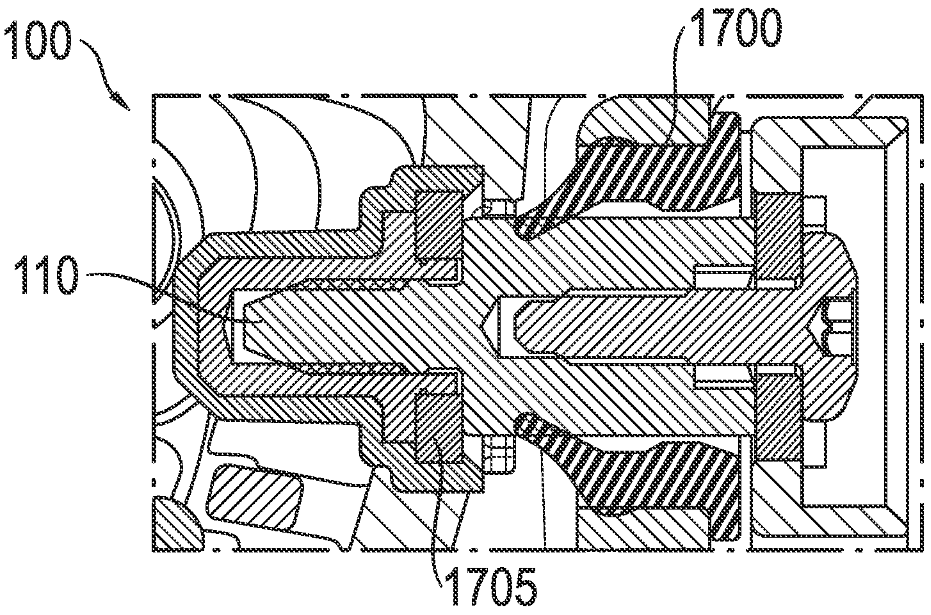
FIG. 17 is a schematic, cross-sectional illustration of an electrical drive system with another sealing device.

FIG. 17 shows a schematic, cross-sectional illustration of an exemplary embodiment of an electrical drive system 100 with another sealing device 1700 for sealing a current-carrying element 110. The sealing device 1700 illustrated here resembles the sealing device described in the preceding figures, with the difference that the sealing device 1700 is formed in one piece from an elastic material. For MHEV transmission applications, the function can be achieved with a simpler seal of complete elastomer. The requirements for disruptive strength are not as high here, so a simpler material (AEM material), which is comparatively cheaper, can be used. The connection of the stud terminal to the busbar contact 1705 also provides a stable connection in the transmission housing. Centring on assembly and additional vibration damping during operation are not required here.

Figure 18:
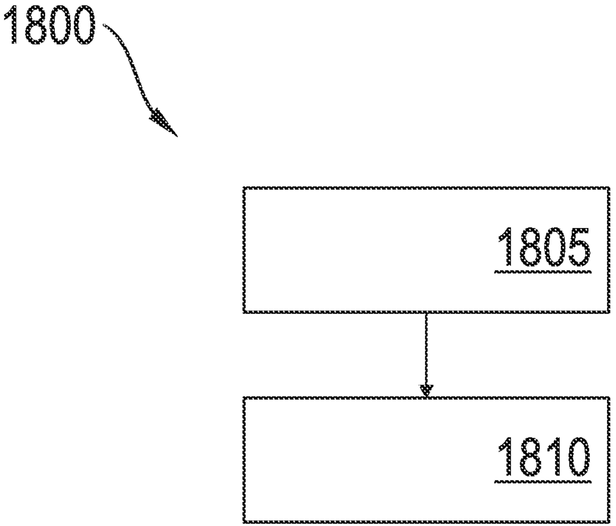
FIG. 18 is a flow diagram of a method for mounting a sealing device.

FIG. 18 shows a block circuit diagram of an exemplary embodiment of a method 1800 for mounting a sealing device. The method 1800 comprises a step 1805 of providing a form sealing unit and a guide sealing unit, and a step 1810 of mounting the form sealing unit with the guide sealing unit in order to produce the sealing device.

The exemplary embodiments described and shown in the figures are merely exemplary. Different exemplary embodiments may be combined with one another in full or with respect to individual features. Also, an exemplary embodiment may be supplemented by features of a further exemplary embodiment.

Furthermore, the method steps according to the invention may be repeated and executed in an order which is different from that described.

If an exemplary embodiment comprises an "and/or" link between a first feature and a second feature, this may be interpreted such that the exemplary embodiment in one embodiment comprises both the first feature and the second feature, and in a further embodiment comprises either only the first feature or only the second feature.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sealing device configured to seal a current-carrying element on an electrical drive system, comprising:

an elastic form sealing unit configured to insulate the current-carrying element against at least a part region of the electrical drive system and having a sealing lip at an axial end that is conically shaped and configured to seal the current-carrying element against fluids; and a single-piece non-elastic guide sealing unit arranged partially radially inside the elastic form sealing unit at a first end and configured to guide the current-carrying element, the guide sealing unit having a rib structure arranged at a second end opposite the first end, the rib structure, wherein radially inner faces of the rib structure directly face the current-carrying element, wherein the form sealing unit and the guide sealing unit are formed to partially engage in one another by form fit in operational state.

2. The sealing device according to claim 1, wherein the form sealing unit and the guide sealing unit are configured as separate and/or separable units.

3. The sealing device according to claim 1, wherein the sealing device is at least partially hollow-cylindrical.

4. The sealing device according to claim 1, wherein the guide sealing unit has at least one positioning portion configured to position the sealing device in an opening of a housing of the electrical drive system, wherein the at least one positioning portion has a radially extending flange, and wherein the guide sealing unit has at least one inner portion opposite the at least one positioning portion, wherein the radially extending flange has a greater outer diameter than the at least one inner portion.

5. The sealing device according to claim 4, wherein the form sealing unit has a receiving portion configured to receive at least a part of the guide sealing unit, wherein an inner diameter of the receiving portion is greater than an inner diameter of the sealing lip.

6. The sealing device according to claim 5, wherein an inner diameter of the at least one inner portion of the guide sealing unit, within a tolerance range, corresponds to an inner diameter of the sealing lip of the form sealing unit, and/or wherein an outer diameter of the at least one positioning portion of the guide sealing unit is at least 20% larger than an outer diameter of the receiving portion of the form sealing unit.

7. The sealing device according to claim 5, wherein an inner diameter of the at least one inner portion of the guide sealing unit is greater than an inner diameter of the sealing lip of the form sealing unit, and/or wherein an outer diameter of the at least one positioning portion of the guide sealing unit is at most 10% larger than an outer diameter of the receiving portion of the form sealing unit.

8. The sealing device according to claim 1, wherein the form sealing unit has a thickening region configured to seal the guide sealing unit against the electrical drive system.

9. The sealing device according to claim 1, wherein the guide sealing unit has a cut-out configured to hold the form sealing unit in or on the guide sealing unit by form fit.

10. The sealing device according to claim 1, wherein the form sealing unit is made from a fluororubber-containing material, and/or wherein the guide sealing unit is made from a material that differs from the material of the form sealing unit.

11. The sealing device according to claim 1, wherein the sealing device seals the current-carrying element on the electrical drive system.

12. The sealing device according to claim 1, wherein the guide sealing unit is configured to engage in the form sealing unit.

13. The sealing device according to claim 1, wherein the sealing lip at the axial end that is conically shaped extends radially inward from a plane formed between a portion of the current-carrying element and the non-elastic guide sealing unit.

14. The sealing device according to claim 1, wherein the sealing lip at the axial end that is conically shaped extends radially inward from an area axially beyond an end of the non-elastic guide sealing unit.

15. The sealing device according to claim 1, wherein the rib structure of the non-elastic guide sealing unit is arranged axially beyond an end of the elastic form sealing surrounding the non-elastic guide sealing unit.

* * * * *